(12) United States Patent
Holdampf et al.

(10) Patent No.: US 8,496,294 B2
(45) Date of Patent: Jul. 30, 2013

(54) STAND AND STOW SEAT FOR HYBRID VEHICLES

(75) Inventors: Carl J. Holdampf, Farmington Hills, MI (US); Ronald A. Zimmerman, II, White Lake, MI (US); Douglas A. Dingel, Brighton, MI (US); Brian Adwell, Waterford, MI (US)

(73) Assignee: Magna Seating Inc, Aurora, Ontario (CA)

( * ) Notice: Subject to any disclaimer, the term of this patent is extended or adjusted under 35 U.S.C. 154(b) by 119 days.

(21) Appl. No.: 13/128,474

(22) PCT Filed: Nov. 10, 2009

(86) PCT No.: PCT/CA2009/001634
§ 371 (c)(1),
(2), (4) Date: May 10, 2011

(87) PCT Pub. No.: WO2010/051646
PCT Pub. Date: May 14, 2010

(65) Prior Publication Data
US 2011/0221239 A1 Sep. 15, 2011

Related U.S. Application Data

(60) Provisional application No. 61/112,806, filed on Nov. 10, 2008.

(51) Int. Cl.
*B60N 2/02* (2006.01)
*B60N 2/20* (2006.01)
(52) U.S. Cl.
USPC ...... 297/316; 297/336; 297/341; 297/378.12; 296/65.09

(58) Field of Classification Search
USPC ... 297/334, 336, 316, 341, 378.12; 296/65.09
See application file for complete search history.

(56) References Cited

U.S. PATENT DOCUMENTS

| | | | |
|---|---|---|---|
| 4,124,250 A | 11/1978 | Weinich | |
| 6,135,555 A | 10/2000 | Liu et al. | |
| 6,196,613 B1 | 3/2001 | Arai | |
| 6,595,588 B2 | 7/2003 | Ellerich et al. | |
| 6,676,216 B1 | 1/2004 | Freijy et al. | |
| 6,991,293 B2 | 1/2006 | Lang et al. | |

(Continued)

FOREIGN PATENT DOCUMENTS

| | | | |
|---|---|---|---|
| GB | 872118 | | 7/1961 |
| WO | WO2006128290 | * | 12/2006 |
| WO | WO2008067648 | * | 6/2008 |
| WO | 2008086597 A1 | | 7/2008 |

*Primary Examiner* — David Dunn
*Assistant Examiner* — Timothy J Brindley
(74) *Attorney, Agent, or Firm* — Miller Canfield

(57) ABSTRACT

A seat assembly for supporting an occupant above a floor includes a support mechanism operatively coupled between a seat back and a seat cushion. A rear end of the seat cushion is released from the support mechanism to pivot the seat cushion from a generally horizontal position to a generally vertical position in response to pivotal movement of the seat back from an upright seating position to a forwardly folded position. The support mechanism is released from the floor and a stand-up link pivotally coupled between the floor and the support mechanism moves the seat cushion from the generally horizontal position to the generally vertical position and simultaneously urges the seat back to pivot relative to the seat cushion, thereby maintaining the seat back in a generally vertical orientation defining a stand-up position.

13 Claims, 13 Drawing Sheets

U.S. PATENT DOCUMENTS

| | | |
|---|---|---|
| 7,079,379 B2 | 7/2006 | Yamaguchi et al. |
| 7,152,921 B2 | 12/2006 | Saberan |
| 7,152,925 B2 | 12/2006 | Hur et al. |
| 7,300,107 B2 * | 11/2007 | Kammerer ................... 297/336 |
| 7,762,604 B1 * | 7/2010 | Lindsay ......................... 296/64 |
| 7,854,462 B2 * | 12/2010 | Scholl ....................... 296/65.09 |
| 7,992,913 B2 * | 8/2011 | Zelmanov et al. ......... 296/65.05 |
| 7,997,653 B2 * | 8/2011 | Szybisty et al. .............. 297/336 |
| 2006/0061174 A1 | 3/2006 | Saberan |
| 2008/0224523 A1 | 9/2008 | Watkins et al. |
| 2009/0243357 A1 * | 10/2009 | Mori et al. .................... 297/325 |

\* cited by examiner

STAND AND STOW SEAT FOR HYBRID VEHICLES

BACKGROUND OF THE INVENTION

1. Field of the Invention

The invention relates to a seat assembly for a motor vehicle. More particularly, the invention relates to a seat assembly operable between a seating position, a fold-and-stow position, and a stand-up position.

2. Description of Related Art

Automotive vehicles include seat assemblies for supporting occupants within the vehicle. It is common in certain mini-van and sport utility vehicles to provide a second row seat assembly directly behind driver and passenger seats and a third row seat assembly in front of a rear cargo area. Such second row seat assemblies may be movable to a variety of positions in order to provide better access to the third row seat assembly and to increase the amount of storage space available within the vehicle.

To increase the size of the available storage space, it is well known that the second row seat assembly may be optionally moved from a seating position to a stowed position. To move the second row seat assembly to the stowed position, a seat back is pivoted from a generally upright position to a forwardly folded position overlying a seat cushion. A seat support mechanism or riser mechanism including front and rear legs that extend between the seat cushion and a floor of the vehicle are provided for moving the seat cushion between a raised position spaced above the floor and a lowered position resting along the floor. In the stowed position the seat cushion is in the lowered position and the seat back is in the forwardly folded position. Thus, when the second row seat assembly is in the stowed position it is lowered against the floor and a back side of the seat back is disposed generally horizontal and defines a load floor surface.

To provide better access to the third row seat assembly, it is well known that the second row seat assembly may be optionally moved to a stand-up position. To move the second row seat assembly to the stand-up position, the seat support mechanism is manipulated to pivot the seat cushion forwardly about a front end from a generally horizontal position to a generally vertical position in which a rear end of the seat cushion is disposed directly above the front end. At the same time, the seat back moves forwardly and upwardly such that it is vertically aligned with the seat cushion.

A typical hybrid motor vehicle includes a fueled power source, such as an internal combustion engine, and an on-board rechargeable energy storage system (RESS). The RESS includes a battery or batteries that are located within the vehicle. The battery or batteries are commonly located beneath the second row seat assembly. Thus, in order to allow the second row seat assembly to move between a seating position, a stowed position, and a stand-up position, as described above, it is necessary to configure the support mechanism such that it does not interfere with the battery or batteries located beneath the second row seat assembly. Further, rather than moving the second row seat assembly to the stowed position lowered against the floor of the vehicle, which is impossible due to the battery or batteries, it is necessary to move the second row seat assembly to a fold-and-stow position. When the second row seat assembly is in the fold-and-stow position the seat cushion is positioned in the generally vertical position with the rear end disposed above the front end, and the seat back is positioned in the forwardly folded position such that the back side of the seat back defines a load floor surface. It is therefore desirable to provide a seat assembly for a hybrid vehicle that includes a support mechanism for moving the seat assembly between a seating position, a fold-and-stow position, and a stand-up position, wherein the support mechanism does not interfere with a battery or batteries located beneath the seat assembly.

SUMMARY OF THE INVENTION

According to one aspect of the invention, a seat assembly is provided for supporting an occupant above a floor. The seat assembly includes a seat cushion having a front end and an opposite rear end. The seat cushion is adapted to be pivotally coupled to the floor about the front end for movement between a generally horizontal position and a generally vertical position in which the rear end is disposed above the front end. A support mechanism is releasably coupled to the rear end of the seat cushion allowing the seat cushion to pivot between the generally horizontal position and the generally vertical position. The support mechanism is adapted to be releasably coupled to the floor. A seat back is operatively coupled to the support mechanism for pivotal movement between a generally upright seating position and a forwardly folded position, wherein pivotal movement of the seat back toward the forwardly folded position actuates the support mechanism to automatically release the rear end of the seat cushion allowing the seat cushion to pivot from the generally horizontal position to the generally vertical position and defining a fold and stow position. A stand-up link is adapted to be pivotally coupled between the floor and the support mechanism, whereby releasing the support mechanism from the floor allows the stand-up link to move the seat cushion from the generally horizontal position to the generally vertical position and simultaneously urges the seat back to pivot relative to the seat cushion, thereby maintaining the seat back in a generally vertical orientation and defining a stand-up position.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Referring to the Figures, wherein like numerals indicate like or corresponding parts throughout the several views, a seat assembly for use in an automotive vehicle is generally shown at 10. In the embodiment shown, the seat assembly 10 is a sixty percent side of a second row seat in a hybrid vehicle having a battery housing 12 located beneath the seat assembly 10. It is appreciated, however, that the seat assembly 10 may be used in any position within the vehicle and within any type of vehicle without varying from the scope of the invention. It is also appreciated that a forty percent side of the second row seat is substantially a mirror image of the seat assembly 10 described herein.

Figure 1:
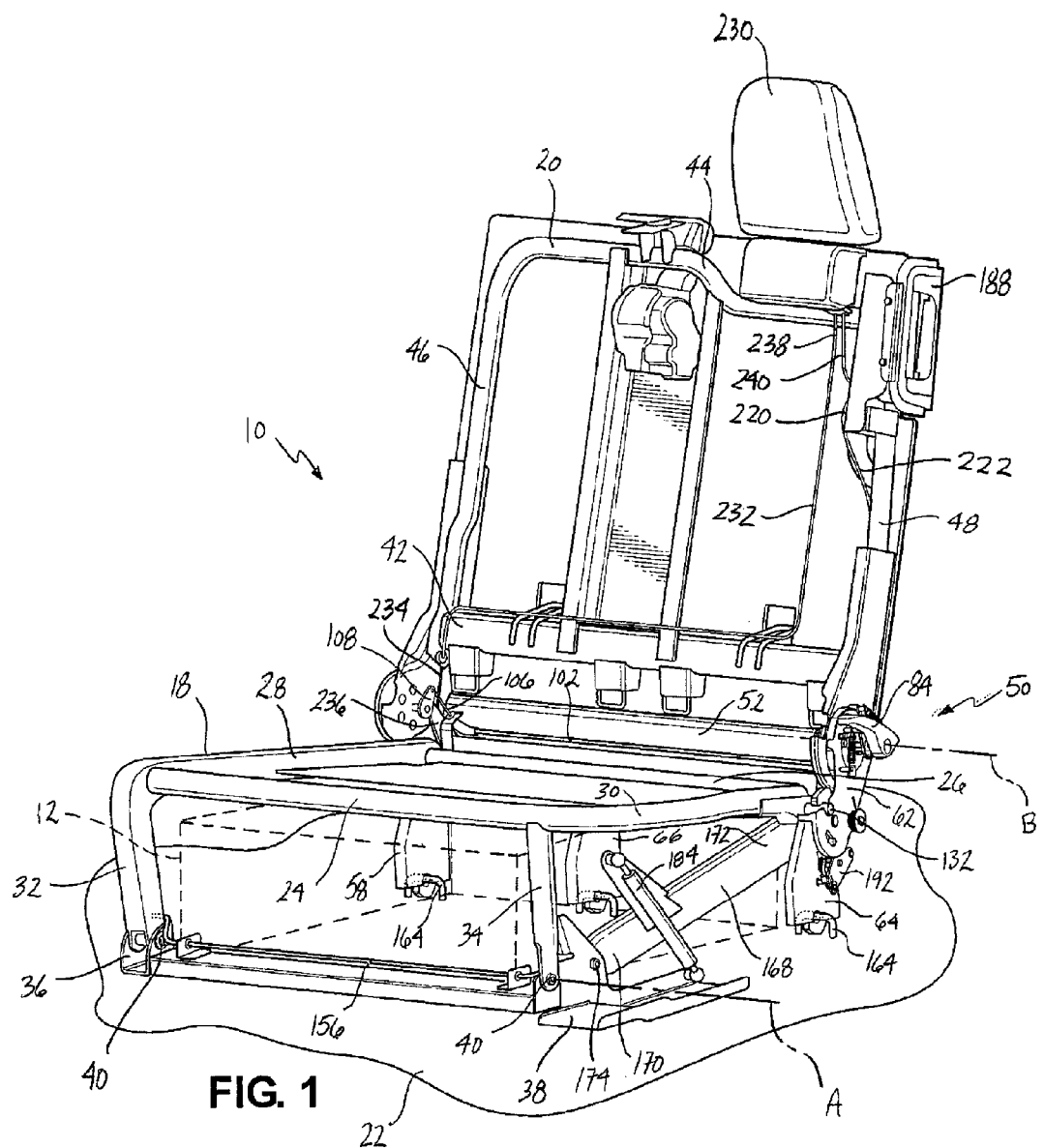
FIG. 1 is a perspective view of a seat assembly in a seating position according to one embodiment of the invention.
Figure 2:
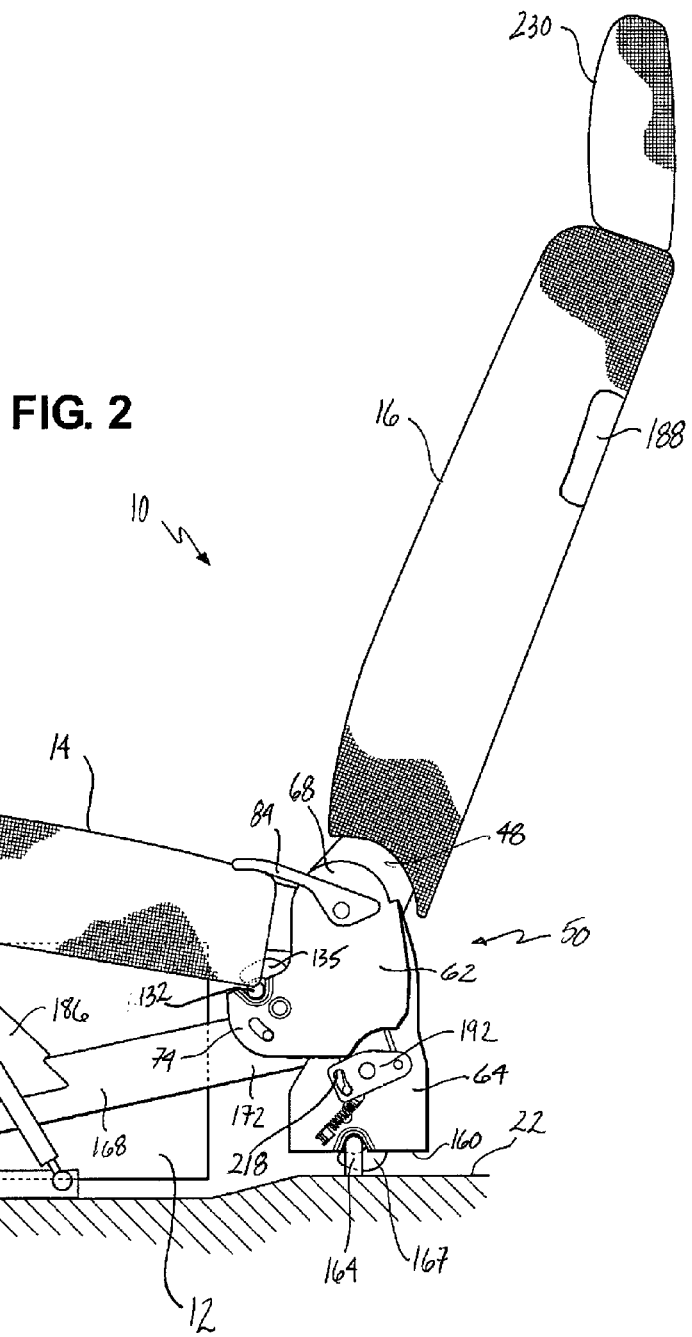
FIG. 2 is a side view of the seat assembly in the seating position.

The seat assembly 10 includes a seat cushion 14 and a seat back 16 operatively coupled to the seat cushion 14. The construction of the seat cushion 14 includes a rigid seat cushion frame 18 for supporting a contoured foam pad encased by a trim cover, as conventionally known to one skilled in the art. Likewise, the construction of the seat back 16 includes a rigid seat back frame 20 for supporting a contoured foam pad encased by a trim cover. In FIGS. 1 and 2, the seat assembly 10 is shown in a seating position for supporting a seat occupant above a vehicle floor 22. In the seating position, the seat cushion 14 is disposed in a generally horizontal position and the seat back 16 is disposed in a generally vertical or upright seating position.

Referring to FIG. 1, the seat cushion frame 18 extends in a longitudinal direction of the seat assembly 10 between a front end 24 and an opposite rear end 26. The seat cushion frame 18 extends in a lateral direction of the seat assembly 10 between an inboard side 28 and an outboard side 30. A pair of front legs 32, 34 extends between the front end 24 of the seat cushion frame 18 and a pair of mounting brackets 36, 38 fixedly secured to the vehicle floor 22. The front legs 32, 34 are fixedly secured to or integrally formed with the front end 24 of the seat cushion frame 18 and are pivotally coupled to the mounting brackets 36, 38 at pivot 40. The pivot 40 defines an axis A extending in the lateral direction of the seat assembly 10 and the seat cushion 14 pivots about the axis A between the generally horizontal position, shown in FIG. 2, and a generally vertical position, shown in FIGS. 3 and 4, in which the rear end 26 of the seat cushion frame 18 is disposed above the front end 24.

The seat back frame 20 extends between a lower end 42 and an opposite upper end 44. The seat back frame 20 extends in the lateral direction of the seat assembly 10 between an inboard side 46 and an outboard side 48. The lower end 42 of the seat back frame 20 is operatively coupled to the rear end 26 of the seat cushion frame 18 allowing for movement of the seat back 16 between the upright seating position, a plurality of reclined seating positions, and a forwardly folded flat position. Each position is described in detail below.

Figure 3:
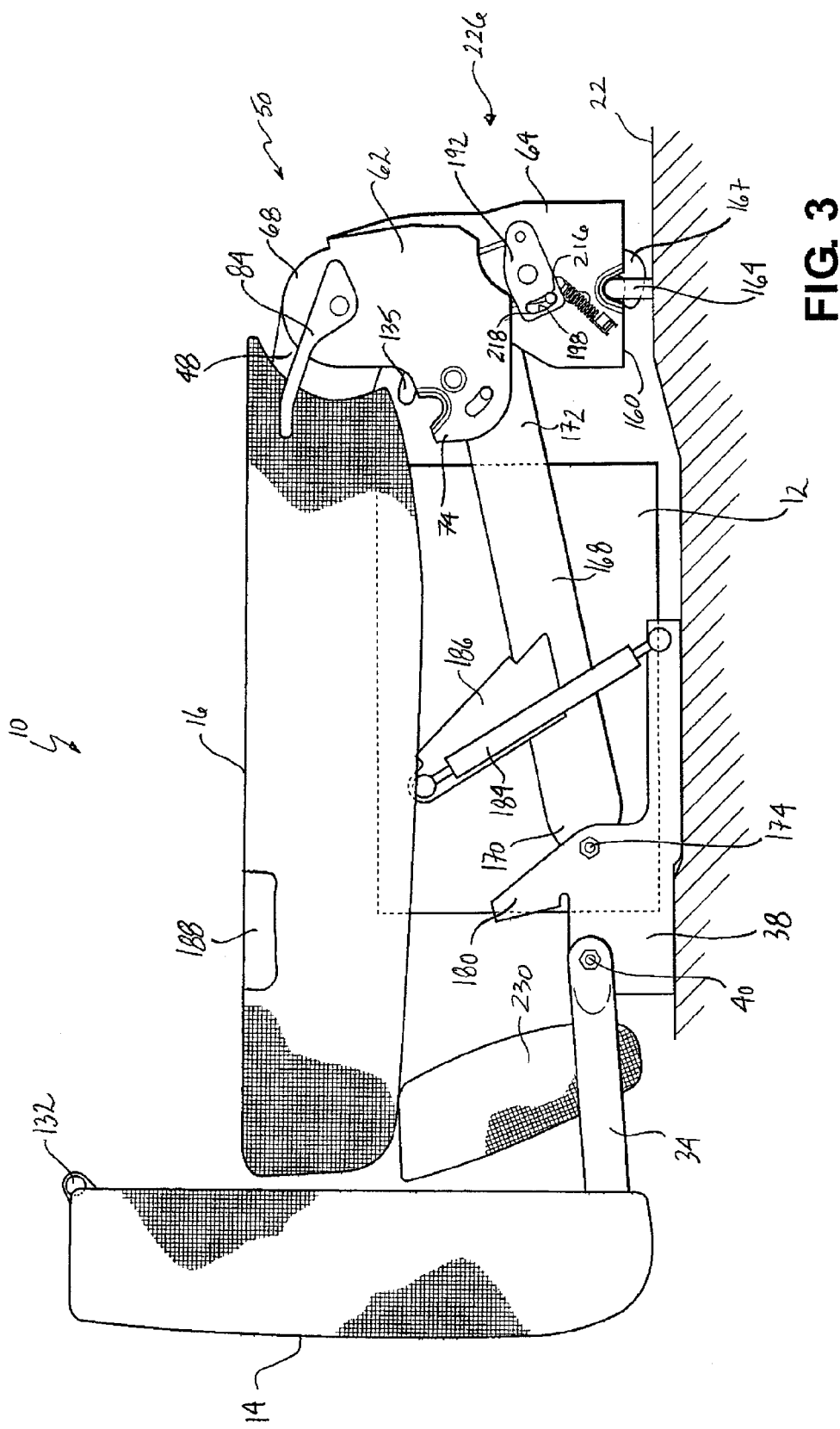
FIG. 3 is a side view of the seat assembly in a fold-and-stow position.
Figure 4:
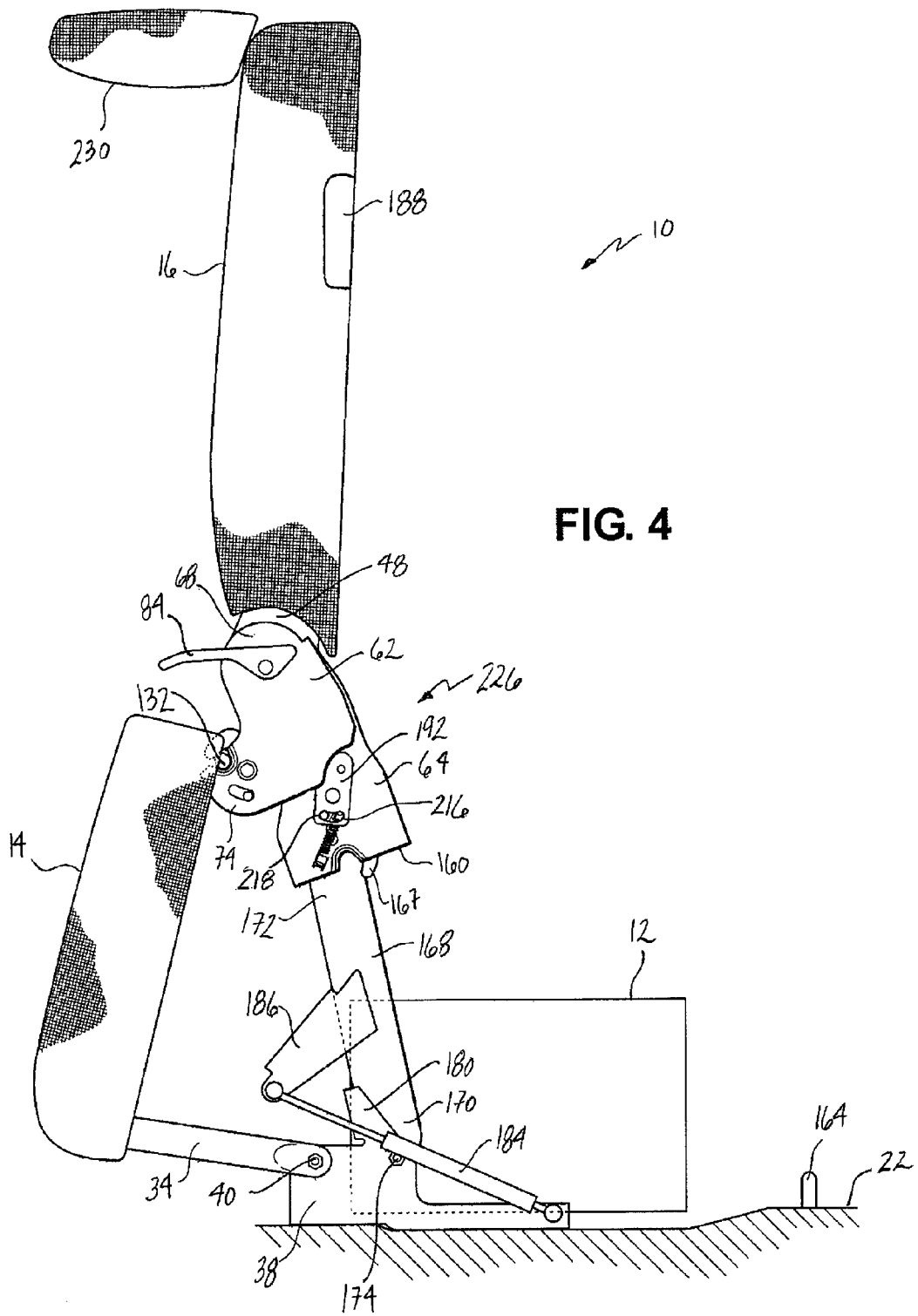
FIG. 4 is a side view of the seat assembly in a stand-up position.

The seat assembly 10 includes a support mechanism, generally shown at 50, for allowing the seat assembly 10 to move between the seating position, shown in FIGS. 1 and 2, a fold-and-stow position, shown in FIG. 3, and stand-up position, shown in FIG. 4. In the fold-and-stow position, the seat cushion 14 is disposed in the generally vertical position and the seat back 16 is uncoupled from the seat cushion 14 and is disposed in a forwardly folded flat position such that a backside of the seat back 16 is generally horizontal. In the stand-up position, the seat cushion 14 is disposed in the generally vertical position and the seat back 16 is coupled to the seat cushion 14 and is disposed in the upright seating position, generally vertically aligned with the seat cushion 14.

Figure 5:
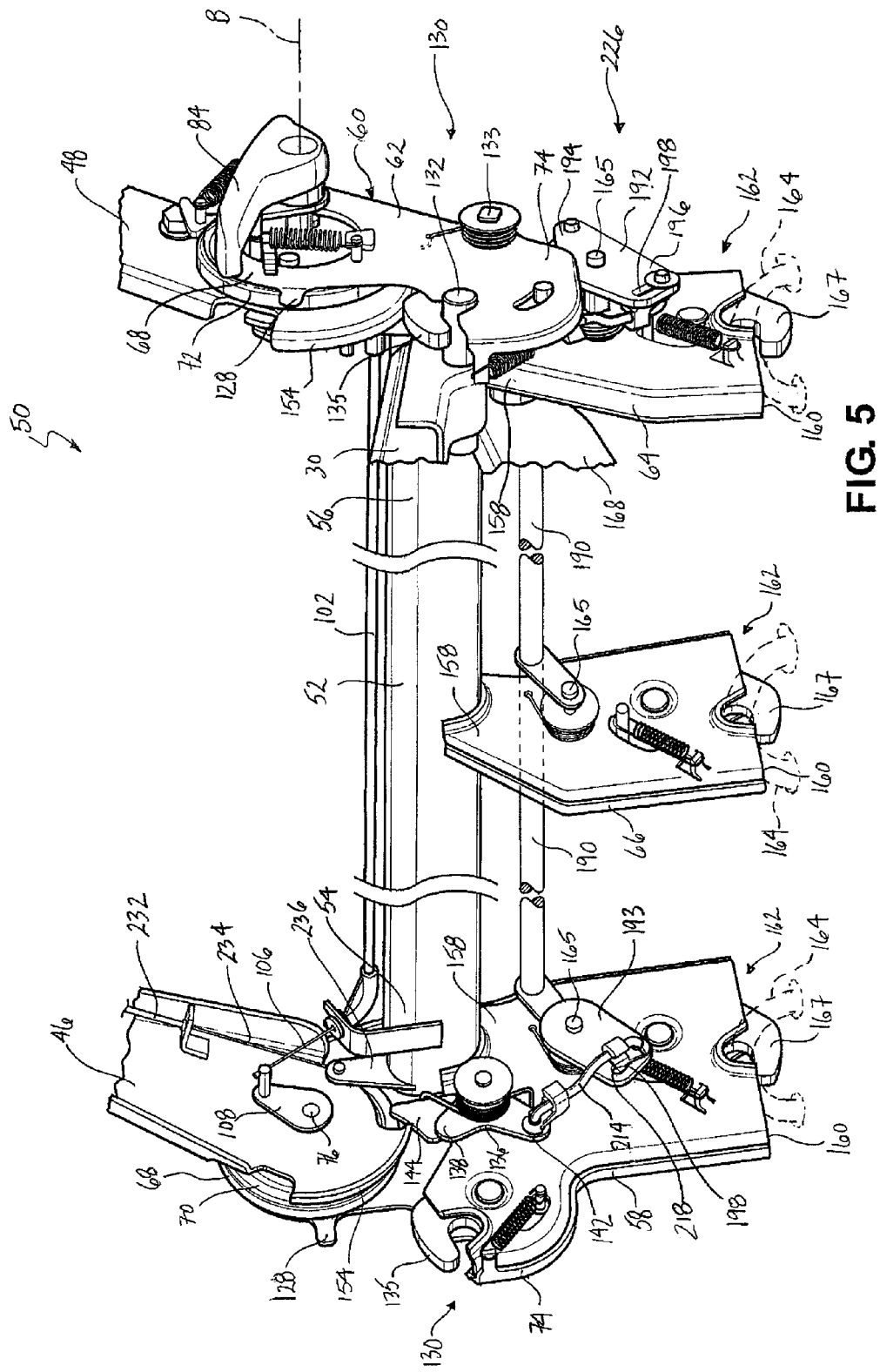
FIG. 5 is a fragmentary, perspective view of a support mechanism of the seat assembly.

Referring to FIG. 5, the support mechanism 50 includes a main cross member 52 extending in the lateral direction of the seat assembly 10 between a first end 54 and a second end 56. An inboard support bracket 58 is fixedly secured to the first end 54 of the main cross member 52 and a two-piece outboard support bracket 60 is fixedly secured to the second end 56 of the main cross member 52. The two-piece outboard support bracket 60 includes an outboard coupling bracket 62 and an outboard floor bracket 64, which is offset from the outboard coupling bracket 62 towards the first end 54 of the main cross member 52. The two-piece outboard support bracket 60 is necessary due to packaging constraints within the vehicle, specifically, to clear a wheel well. It is appreciated, however, that the outboard support bracket 60 could be a one-piece bracket like the inboard support bracket 58 without varying form the scope of the invention. A middle support bracket 66 is fixedly secured to the main cross member 52 generally midway between the inboard support bracket 58 and the outboard floor bracket 64.

Each of the inboard support bracket 58 and the outboard coupling bracket 62 extend between a first end 68 adapted to receive an inboard 70 and outboard 72 disc recliner, respectively, and an opposite second end 74. The disc recliners 70, 72 are operatively coupled between the lower end 42 of each of the inboard 46 and outboard 48 sides of the seat back frame 20 and the first end 70 of the respective inboard support bracket 58 and outboard coupling bracket 62. The disc recliners 70, 72 each include an axial shaft 76, best seen in FIGS. 8 and 6 respectively, defining an axis B extending in the lateral direction of the seat assembly 10. The seat back 16 pivots about the axis B relative to the seat cushion 14. The disc recliners 70, 72 are selectively actuated between a locked state preventing pivotal movement of the seat back 16 and an unlocked state allowing the seat back 16 to pivot about the axis B by rotating the axial shaft 76. The seat back 16 is biased by a clock spring 78, shown in FIG. 9, towards the forwardly folded flat position. The clock spring 78 is disposed adjacent to an outer side 79 of the inboard support bracket 58. The clock spring 78 is coupled between a spring mounting pin 80 that is fixedly secured to the inboard support bracket 58 and a seat back bracket 82 fixedly secured to the lower end 42 of the inboard side 46 of the seat back frame 20.

Figure 6:
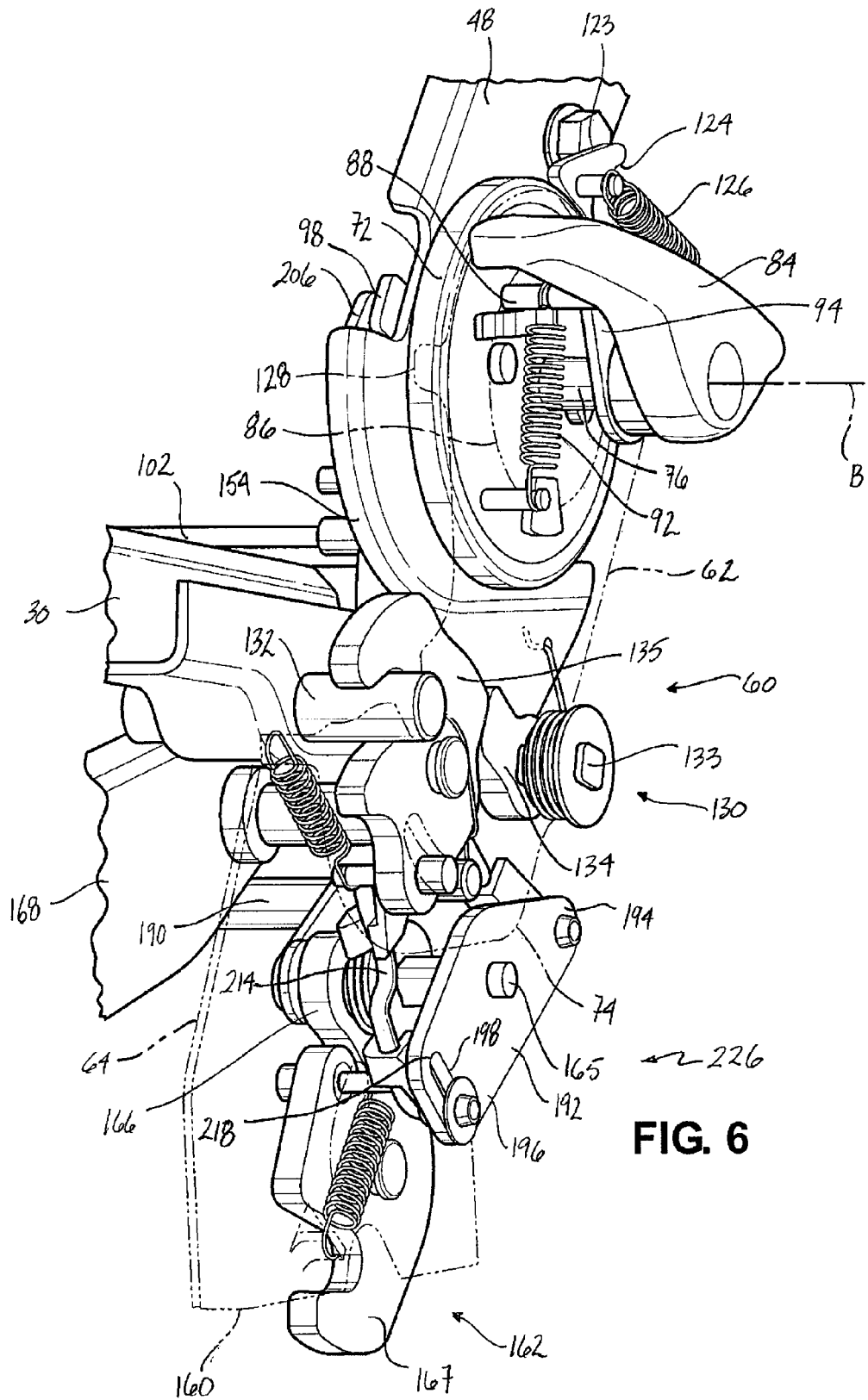
FIG. 6 is a fragmentary, outer perspective view of an outboard side of the support mechanism.
Figure 10:
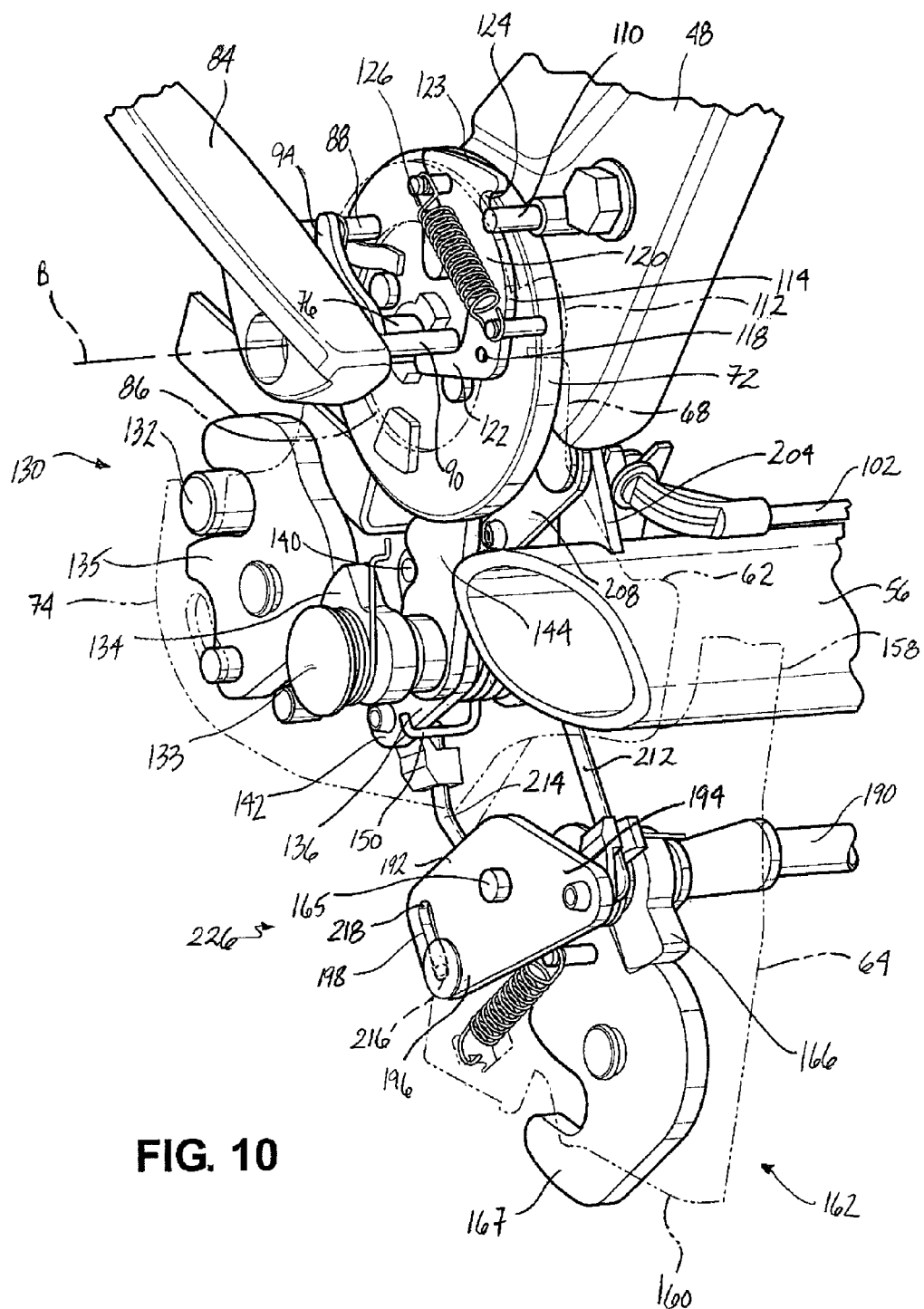
FIG. 10 is a fragmentary, outer rear perspective view of the outboard side of the support mechanism.

Referring to FIGS. 6 and 10, a recliner handle 84 is provided for actuating the inboard 70 and outboard 72 disc recliners from the locked state to the unlocked state. The recliner handle 84 is pivotally coupled to an outer end of the axial shaft 76 of the outboard disc recliner 72 that extends outwardly through an aperture 86 in the outboard coupling bracket 62. The recliner handle 84 includes a forward pin 88 and a rearward pin 90 extending inwardly towards the outboard coupling bracket 62. The recliner handle 84 is biased to a rest position by an extension spring 92 extending between the forward pin 88 and the outboard coupling bracket 62. A first recliner lever 94 is fixedly secured to the axial shaft 76 between the recliner handle 84 and the outboard coupling bracket 62. Lifting the recliner handle 84 to pivot about the axial shaft 76 causes the forward pin 88 to engage and pivot the first recliner lever 94 in a first direction. Pivoting the first recliner lever 94 in the first direction therefore causes the axial shaft 76 to rotate in the first direction, which actuates the outboard disc recliner 72 from the locked state to the unlocked state.

Figure 7:
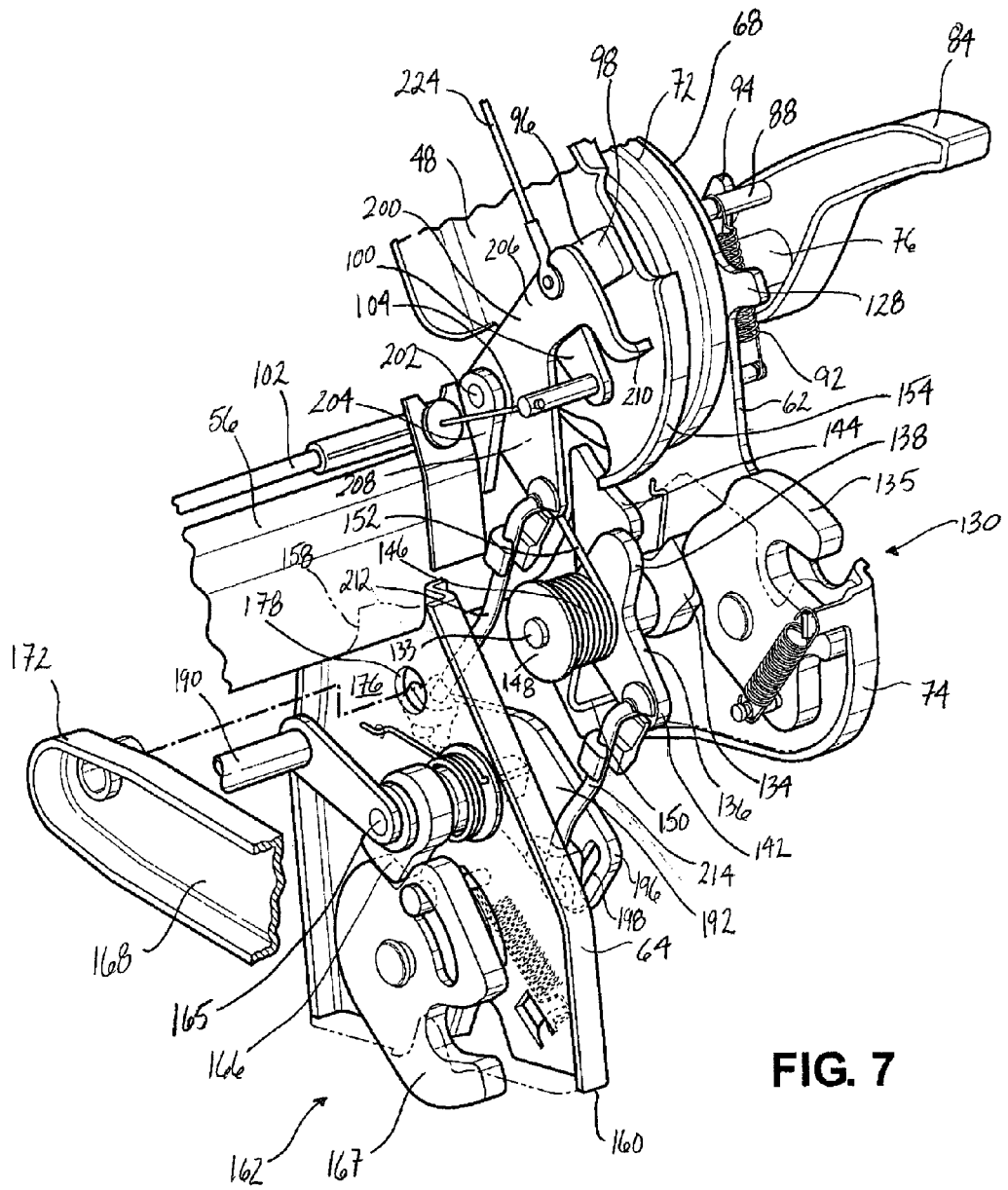
FIG. 7 is a fragmentary, inner perspective view of the outboard side of the support mechanism.

Referring to FIG. 7, a generally L-shaped second recliner lever 96 is fixedly secured to an inner end of the axial shaft 76 of the outboard disc recliner 72 which extends inwardly through an aperture (not shown) in the lower end 42 of the outboard side 48 of the seat back frame 20. The second recliner lever 96 includes a first arm 98 and a second arm 100. As the axial shaft 76 rotates in the first direction, the second recliner lever 96 pivots in the first direction and pulls a first Bowden-type cable 102 operatively coupled to the inboard disc recliner 70. More specifically, a first end 104 of the first cable 102 is coupled to the second arm 100 of the second recliner lever 96 and a second end 106 of the first cable 102 is coupled to a third recliner lever 108, shown in FIG. 8. The third recliner lever 108 is fixedly secured to an inner end of the axial shaft 76 of the inboard disc recliner 70 that extends inwardly through an aperture (not shown) in the lower end 42 of the inboard side 46 of the seat back frame 20. Pulling the first cable 102 causes the third recliner lever 108 to pivot in the first direction. Pivoting the third recliner lever 108 in the first direction therefore causes the axial shaft 76 to rotate in the first direction, which actuates the inboard disc recliner 70 from the locked state to the unlocked state. With the inboard 70 and outboard 72 disc recliners in the unlocked state, the seat back 16 can pivot about the axis B.

When the recliner handle 84 is lifted to actuate the inboard 70 and outboard 72 disc recliners to the unlocked state by an occupant seated on the seat assembly 10 the seat back 16 can be selectively pivoted between the upright seating position and the plurality of reclined seating positions. A rearmost reclined seating position is defined when the seat back bracket 82 on the inboard side 46 of the seat back frame 20, shown in FIG. 9, and a stop pin 110 on the outboard side 48 of the seat back frame 20, shown in FIG. 10, abut a rear stop 112 protruding from the first end 68 of the respective inboard support bracket 58 and outboard coupling bracket 62.

Referring to FIG. 10, a dress-up member 114 is provided for engaging the stop pin 110 to locate the seat back 16 in the upright seating position when the seat assembly 10 is moved to the stand-up position, as is described below in detail. The stop pin 110 is fixedly secured to the lower end 42 of the outboard side 48 of the seat back frame 20 and extends outwardly therefrom. The dress-up member 114 is pivotally coupled to the outboard coupling bracket 62 at pivot 118 and includes a main portion 120 on one side of the pivot 118 and a tail portion 122 on the other side of the pivot 118. The main portion 120 includes a ramped leading edge 123 and a recess 124. The dress-up member 114 is biased to a engaging position by an extension spring 126 extending between the main portion 120 and the outboard coupling bracket 62. When the dress-up member 114 is in the engaging position, the stop pin 110 will engage the recess 124 to locate the seat back 16 in the upright seating position. The dress-up member 114 is pivoted to a retracted position to allow the seat back 16 to pivot to the forwardly folded position without the stop pin 110 engaging the recess 124. Lifting the recliner handle 84 to pivot about the axial shaft 76 causes the rearward pin 90 to engage the tail portion 122 of the dress-up member 114 and pivots the dress-up member 114 in the second direction to the retracted position to allow the seat back 16 to pivot to the forwardly folded flat position. Thus, when the recliner handle 84 is lifted to actuate the inboard 70 and outboard 72 disc recliners to the unlocked state when no occupant is seated on the seat assembly 10, the dress-up member 114 is pivoted to the retracted position and the seat back 16 is biased by the clock spring 78 towards the forwardly folded flat position. The forwardly folded flat position of the seat back 16 is defined when the seat back bracket 82 on the inboard side 46 of the seat back frame 20 and the stop pin 110 on the outboard side 48 of the seat back frame 20 abut a front stop 128, shown in FIG. 5, protruding from the first end 68 of the respective inboard support bracket 58 and outboard coupling bracket 62.

Referring to FIGS. 5 through 10, the second end 74 of each of the inboard support bracket 58 and the outboard coupling bracket 62 includes a coupling latch 130 operable between a latched state engaging a seat striker 132 (one shown) that is fixedly secured to the respective inboard 28 and outboard 30 sides at the rear end 26 of the seat cushion frame 18 and an unlatched state released from the respective seat strikers 132. The coupling latches 130 are selectively actuated between the latched and unlatched states by rotating a shaft 133 to pivot a pawl 134 between a first position and a second position to release a seat ratchet 135, as is well known to one skilled in the art.

Figure 8:
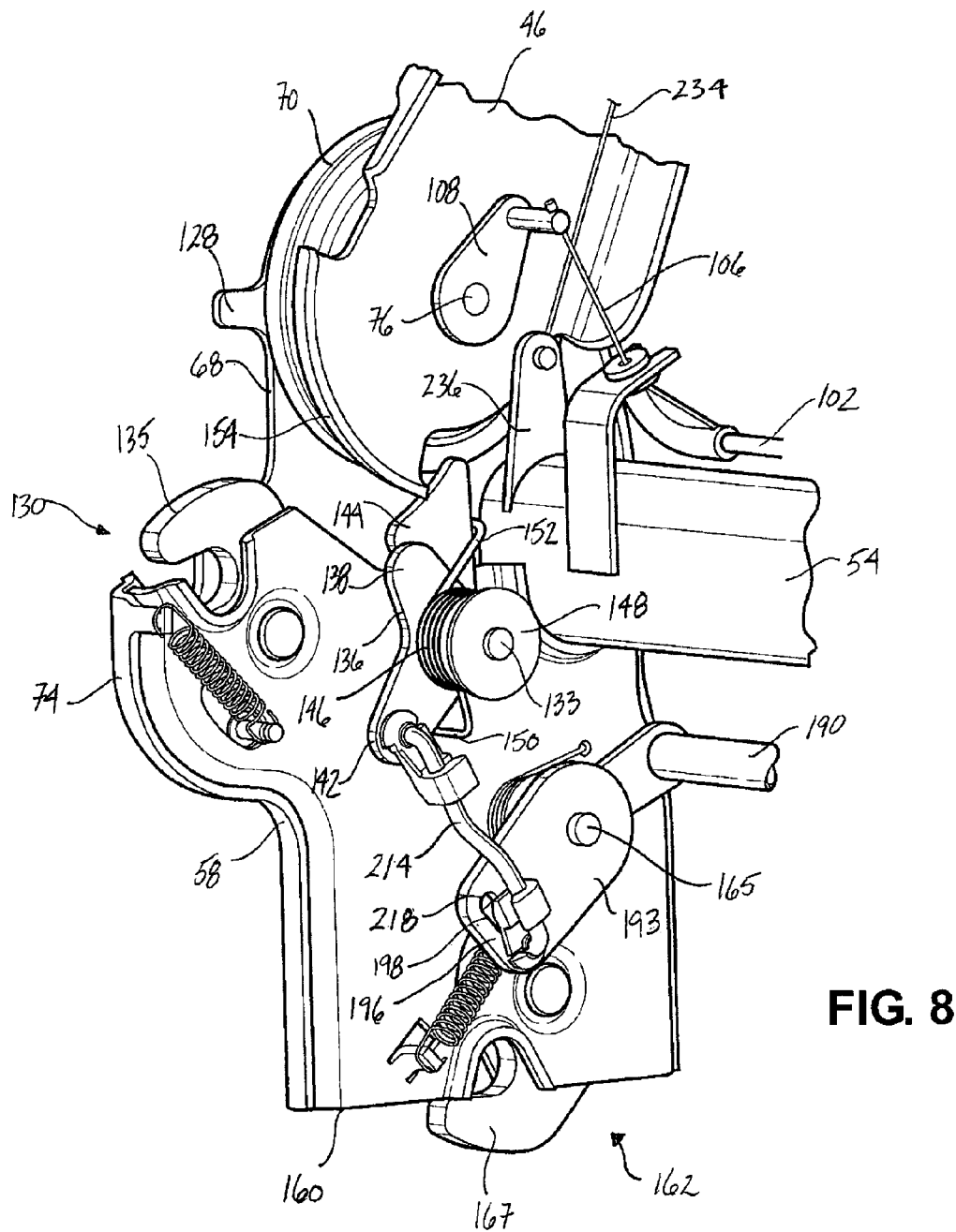
FIG. 8 is a fragmentary, inner perspective view of an inboard side of the support mechanism.
Figure 9:
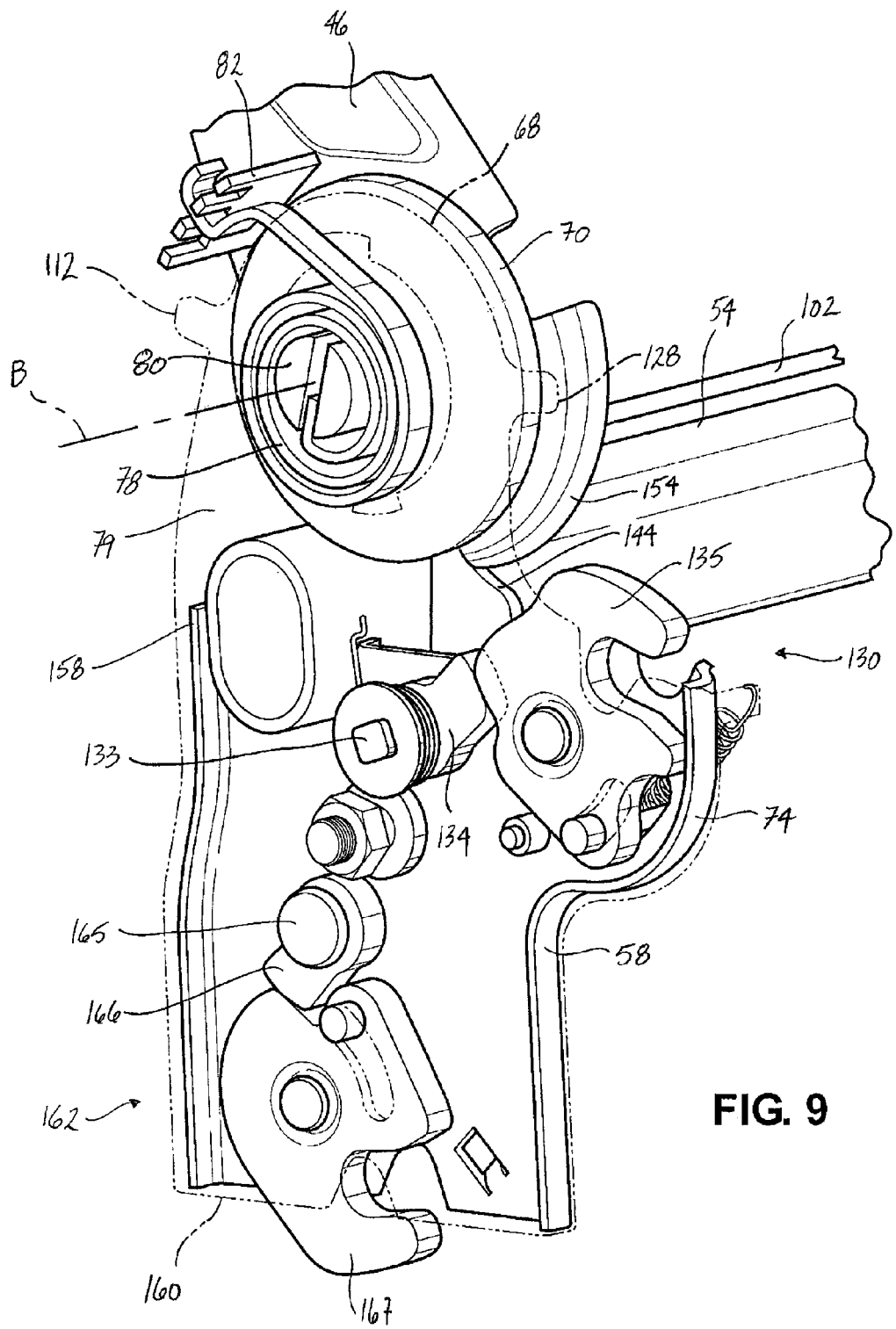
FIG. 9 is a fragmentary, outer perspective view of the inboard side of the support mechanism.

As the seat back 16 pivots towards the forwardly folded flat position it causes the rear end 26 of the seat cushion frame 18 to uncouple from the support mechanism 50 allowing the seat cushion 14 to pivot forwardly about the axis A to the generally vertical position. The rear end 26 of the seat cushion frame 18 is uncoupled from the support mechanism 50 by rotating each shaft 133 in the first direction to actuate the respective coupling latches 130 from the latched state to the unlatched state. A generally L-shaped actuating lever 136, shown in FIG. 7, is fixedly secured to each shaft 133 and includes a first arm 138 having a pin 140, shown in FIG. 10, extending laterally outward therefrom and a second arm 142. A shark fin lever 144, shown in FIGS. 7 and 8, is pivotally coupled to each shaft 133 and is disposed between the actuating lever 136 and the respective inboard support bracket 58 and outboard coupling bracket 62. The shark fin lever 144 is biased in a second direction against the pin 140 of the actuating lever 136 by a coupling spring 146. The coupling spring 146 is disposed about an inner end of the shaft 133 and is held between the actuating lever 136 and a washer 148 fixed to the inner end of the shaft 133. The coupling spring 146 includes a first end 150 engaging the second arm 142 of the actuating lever 136 and a second end 152 engaging the shark fin lever 144 thereby coupling the actuating lever 136 and the shark fin lever 144 together. As the seat back 16 pivots towards the forwardly folded flat position an arcuate flange 154 at the lower end 42 of the inboard 46 and outboard 48 sides of the seat back frame 20 engages the respective shark fin levers 144 and pivots the shark fin levers 144 in the first direction, which causes the actuating levers 136 to also pivot in the first direction. Pivoting the actuating levers 136 in the first direction therefore causes the respective shafts 133 to rotate in the first direction, which actuates the coupling latches 130 from the latched state to the unlatched state. With the coupling latches 130 in the unlatched state, a biasing means 156, shown in FIG. 1, urges the seat cushion 14 to pivot about the axis A from the generally horizontal position to the generally vertical position. The seat assembly 10 is in the fold-and-stow position when the seat cushion 14 is in the generally vertical position and the seat back 16 is in the forwardly folded flat position.

Each of the inboard support bracket 58, middle support bracket 66, and outboard floor bracket 64 extend between an upper end 158 that is fixedly secured to the main cross member 52 and an opposite lower end 160. The lower end 160 of each of the inboard support bracket 58, middle support bracket 66, and outboard floor bracket 64 includes a floor latch 162 operable between a latched state engaging a floor striker 164 that is fixedly secured to the vehicle floor 22 and an unlatched state released from the respective floor striker 164. The floor latches 162 are selectively actuated between the latched and unlatched states by rotating a shaft 165 to pivot a pawl 166, shown in FIG. 7, between a first position and a second position to release a floor ratchet 167, as is well known to one skilled in the art. It is appreciated that the middle support bracket 66 is provided as an additional connection between the seat assembly 10 and the vehicle floor 22 to increase seat rigidity in the seating position and is not required for proper function or operation of the seat assembly 10.

Referring to FIGS. 1 through 4, a drive link or stand-up link 168 is provided for urging the seat assembly 10 between the seating position and the stand-up position. The stand-up link 168 extends between opposite first 170 and second 172 ends. The first end 170 of the stand-up link 168 is pivotally coupled to the mounting bracket 38 at pivot 174, adjacent to the outboard front leg 34. The second end 172 of the stand-up link 168 is pivotally coupled to an inner side 176 at the upper end 158 of the outboard floor bracket 64 at pivot 178, shown in FIG. 7. The stand-up link 168 pivots about pivot 174 to move the seat assembly 10 between the seating position and the stand-up position. When the seat assembly 10 is in the stand-up position, shown in FIG. 4, the stand-up link 168 abuts against a forward stop bracket 180 to prevent further pivotal movement of the stand-up link 168. A torsion spring (not shown) is disposed about the pivot 174 and is coupled between the mounting bracket 38 and the stand-up link 168 to bias the seat assembly 10 from the seating position to the stand-up position. A gas-filled or similar type of damper 184 is provided for controlling movement of the seat assembly 10 between the seating position and the stand-up position. The damper 184 is pivotally coupled between a forwardly extending attachment portion 186 of the stand-up link 168 and an elongated portion of the mounting bracket 38 or another point along the vehicle floor 22. The damper 184 extends or lengthens as the seat assembly 10 moves from the seating position to the stand-up position and compresses or shortens during an opposite return movement of the seat assembly 10.

The seat assembly 10 is moved between the seating position and the stand-up position by actuating a seat back handle 188 that is operatively mounted to the upper end 44 of the outboard side 48 of the seat back frame 20. The seat back handle 188 actuates the floor latches 162 to the unlatched state to allow the seat cushion 14 to pivot about the axis A from the generally horizontal position to the generally vertical position. The seat back handle 188 also actuates the inboard 70 and outboard 72 disc recliners to the unlocked state to allow the seat back 16 to pivot to the upright seating position as the stand-up link 168 urges the seat assembly 10 from the seating position to the stand-up position.

Referring to FIGS. 5 through 10, the floor latches 162 are operatively coupled together by a cross-talk tube 190 and actuate from the latched state to the unlatched state simultaneously by pivoting a floor latch lever 192 in the second direction. The cross-talk tube 190 is operatively coupled to the shaft 165 of the floor latches 162 of the inboard support bracket 58, middle support bracket 66, and outboard floor bracket 64. The floor latch lever 192 is fixedly secured to an outer end of the shaft 165 of the floor latch 162 of the outboard floor bracket 64. The floor latch lever 192 extends between a first end 194 and a second end 196 having a slot 198. Similarly, an interlock lever 193 is fixedly secured to an inner end of the shaft 165 of the floor latch 162 of the inboard support bracket 58. The interlock lever 193 also includes the slot 198 formed therein. The purpose of the interlock lever 193 is described below.

A secondary lever 200 is pivotally coupled at pivot 202 to a mount 204 that in turn is fixedly secured to the second end 56 of the main cross member 52, as shown in FIG. 7. The secondary lever 200 is disposed adjacent to the second recliner lever 96 and includes a first portion 206 and a second portion 208. The first portion 206 includes a finger 210 extending laterally outward for engaging the first arm 98 of the second recliner lever 96. A first rod 212 is pivotally coupled between the second portion 208 and the first end 194 of the floor latch lever 192. A second rod 214 is pivotally coupled between the second arm 142 of each one of the actuating levers 136 and the slot 198 in the floor latch lever 192 and interlock lever 193, respectively. The second rods 214 are located at a distal end 216 of the respective slots 198 when the seat assembly 10 is in the seating position, as shown in FIG. 10. When the floor latch lever 192 is pivoted in the second direction to actuate the floor latches 162 to the unlatched state the second rods 214 travel from the distal end 216 to a proximal end 218 of the respective slots 198.

A first end 220 of a second Bowden-type cable 222 is coupled to the seat back handle 188, shown in FIG. 1, and a second end 224 of the second cable 222 is coupled to the first portion 206 of the secondary lever 200, shown in FIG. 7. Operating the seat back handle 188 pulls the second cable 222 and pivots the secondary lever 200 in the first direction thereby pulling the first rod 212 upwardly and causing the floor latch lever 192 to rotate in the second direction, which actuates the floor latches 162 from the latched state to the unlatched state. As the secondary lever 200 continues to pivot in the first direction, the finger 210 engages the first arm 98 of the second recliner lever 96 and pivots the second recliner lever 96 in the first direction. Pivoting the second recliner lever 96 in the first direction therefore causes the axial shaft 76 to rotate in the first direction, which actuates the outboard disc recliner 72 from the locked state to the unlocked state. At the same time, the second recliner lever 96 pulls the first cable 102 and causes the third recliner lever 108 to pivot in the first direction. Pivoting the third recliner lever 108 in the first direction therefore causes the axial shaft 76 to rotate in the first direction, which actuates the inboard disc recliner 70 from the locked state to the unlocked state. With the inboard 70 and outboard 72 disc recliners in the unlocked state, the seat back 16 is biased forwardly about the axis B towards the upright seating position. The recliner handle 84 is pivotally coupled to the axial shaft 76 of the outboard disc recliner 72 and is effectively decoupled during actuation of the outboard disc recliner 72 by the seat back handle 188. As such, the dress-up member 114 remains in the engaging position and the stop pin 110 on the outboard side 48 of the seat back frame 20 will engage the recess 124 of the dress-up member 114 to locate the seat back 16 in the upright seating position. With the floor latches 162 disengaged from the floor strikers 164, the stand-up link 168 pivots in the second direction about the pivot 174 and urges the seat assembly 10 forwardly and upwardly causing the support mechanism 50 to pivot in the first direction about pivot 178 such that the seat back 16 is generally vertically aligned with the seat cushion 14 in the generally vertical position.

In operation, beginning with the seat assembly 10 in the seating position, the seat assembly 10 is moved to the fold-and-stow position by lifting the recliner handle 84. Lifting the recliner handle 84 causes the forward pin 88 to engage the first recliner lever 94 and pivot the first recliner lever 94 in the first direction. Pivoting the first recliner lever 94 in the first direction rotates the axial shaft 76 in the first direction, which actuates the outboard disc recliner 72 from the locked state to the unlocked state. At the same time, lifting the recliner handle 84 causes the rearward pin 90 to engage the tail portion 122 of the dress-up member 114 and pivot the dress-up member 114 to the retracted position. As the axial shaft 76 rotates in the first direction, the second recliner lever 96 pivots in the first direction and pulls the first cable 102, which causes the third recliner lever 108 to pivot in the first direction. Pivoting the third recliner lever 108 in the first direction rotates the axial shaft 76 in the first direction, which actuates the inboard disc recliner 70 from the locked state to the unlocked state. With the inboard 70 and outboard 72 disc recliners in the unlocked state and the dress-up member 114 in the retracted position, the seat back 16 is biased by the clock spring 78 to pivot about the axis B towards the forwardly folded flat position. As the seat back 16 pivots towards the forwardly folded flat position, the arcuate flanges 154 engage the respective shark fin levers 144 and pivot the shark fin levers 144 in the first direction, which causes the actuating levers 136 to rotate in the first direction. Rotating the actuating levers 136 in the first direction causes the respective shafts 133 to rotate in the first direction, which actuates the coupling latches 130 from the latched state to the unlatched state. The biasing means 156 then urges the seat cushion 14 to pivot about the axis A from the generally horizontal position to the generally vertical position. The seat back 16 continues to pivot towards the forwardly folded flat position until the seat back bracket 82 and the stop pin 110 abut the front stop 128 on the respective inboard support bracket 58 and outboard coupling bracket 62. The seat assembly 10 is in the fold-and-stow position when the seat cushion 14 is in the generally vertical position and the seat back 16 is in the forwardly folded flat position.

An interlock 226 is provided to prevent decoupling of the support mechanism 50 from the vehicle floor 22 when the seat assembly 10 is in the fold-and-stow position. Specifically, when the seat back 16 is in the forwardly folded flat position the actuating levers 136 are rotated in the first direction such that the second rods 214 are disposed at the proximal end 218 of the slot 198 in the respective floor latch lever 192 and interlock lever 193. This prevents the floor latch lever 192 from rotating in the second direction. Thus, operation of the seat back handle 188 does not actuate the floor latches 162 from the latched state to the unlatched state because the first rod 212 cannot rotate the floor latch lever 192 in the second direction. Therefore, the floor latches 162 remain engaged with the strikers 164.

To return the seat assembly 10 to the seating position, the seat back 16 is pivoted about the axis B towards the upright seating position. As the seat back 16 is returned to the upright seating position the stop pin 110 will engage and ride along the ramped leading edge 123 of the dress-up member 114 and pivot the dress-up member 114 out of the way towards the retracted position. Once the stop pin 110 is beyond the ramped leading edge 123 the dress-up member 114 will pivot back to the engaging position and the stop pin 110 will engage the recess 124 to locate the seat back 16 in the upright seating position, which allows the inboard 70 and outboard 72 disc recliners to return to the locked state. The seat cushion 14 is then returned to the generally horizontal position by pivoting the seat cushion 14 about the axis A until the seat strikers 132 engage the coupling latches 130.

In further operation, beginning again with the seat assembly 10 in the seating position, the seat assembly 10 is moved to the stand-up position by operating the seat back handle 188. Operating the seat back handle 188 pulls the second cable 222 and pivots the secondary lever 200 in the first direction, thereby pulling the first rod 212 upwardly and causing the floor latch lever 192 to rotate in the second direction, which actuates the floor latches 162 from the latched state to the unlatched state. As the secondary lever 200 continues to pivot in the first direction, the finger 210 engages the second recliner lever 96 and pivots the second recliner lever 96 in the first direction. Pivoting the second recliner lever 96 in the first direction rotates the axial shaft 76 in the first direction, which actuates the outboard disc recliner 72 from the locked state to the unlocked state. At the same time the second recliner lever 96 pulls the first cable 102, which causes the third recliner lever 108 to pivot in the first direction. Pivoting the third recliner lever 108 in the first direction rotates the axial shaft 76 in the first direction, which actuates the inboard disc recliner 70 from the locked state to the unlocked state. With the inboard 70 and outboard 72 disc recliners in the unlocked state the seat back 16 is biased by the clock spring 78 to pivot about the axis B towards the upright seating position. Because the dress-up member 114 is in the engaging position, the stop pin 110 engages the recess 124 of the dress-up member 114 and locates the seat back 16 in the upright seating position. Additionally, with the floor latches 162 in the unlatched state, the stand-up link 168 urges the seat cushion 14 to pivot about the axis A toward the generally vertical position and pivots the support mechanism 50 in the first direction about pivot 178 to generally vertically align the seat back 16 with the seat cushion 14.

The inter-lock 226 is also provided to prevent decoupling of the seat cushion 14 and seat back 16 when the seat assembly 10 is in the stand-up position. Specifically, when the seat assembly 10 is in the stand-up position the second rods 214 are disposed at the proximal end 218 of the slot 198 in the respective floor latch lever 192, shown in FIG. 4, and the interlock lever 193. With the second rods 214 at the proximal end 218 of the slots 198 the actuating levers 136 cannot rotate in the first direction to actuate the coupling latches 130 to the unlatched state. Therefore, if the recliner handle 84 is operated when the seat assembly 10 is in the stand-up position the inboard 70 and outboard 72 disc recliners will actuate to the unlocked state and the seat back 16 will pivot forwardly, but the coupling latches 130 will remain in the latched state. More specifically, as the seat back 16 pivots forwardly and the arcuate flanges 154 engage and pivot the respective shark fin levers 144 in the first direction, the second rods 214 disposed at the proximal end 218 of the slots 198 will prevent the actuating levers 136 from rotating in the first direction. Rather, the coupling springs 146 allow the respective shark fin levers 144 to pivot in the first direction while the actuating levers 136 remain stationary and the coupling latches 130 remain in the latched state.

To return the seat assembly 10 to the seating position, the seat assembly 10 is pushed rearwardly such that the stand-up link 168 urges the support mechanism 50 to pivot in the second direction about pivot 178. At the same time, the seat cushion 14 is returned to the generally horizontal position by pivoting the seat cushion 14 about axis A until the floor latches 162 engage the floor strikers 164.

In the embodiment shown, the seat assembly 10 also includes a head restraint 230 that is operatively coupled to the upper end 44 of the seat back frame 20. The head restraint 230 pivots between an upright or use position when the seat assembly 10 is in the seating position, shown in FIGS. 1 and 2, and a folded or stowed position when the seat assembly 10 is in either the fold-and-stow position or the stand-up position, shown in FIGS. 3 and 4, respectively. The head restraint 230 is automatically biased to the stowed position. A third Bowden-type cable 232 is operatively coupled between the head restraint 230 and the main cross member 52 to actuate the head restraint 230 from the use position to the stowed position as the seat back 16 pivots towards the forwardly folded flat position to prevent interference between the head restraint 230 and the seat cushion 14. More specifically, a first end 234 of the third cable 232, shown in FIG. 8, is coupled to a mount 236 that in turn is fixedly secured to the first end 54 of the main cross member 52 and a second end 238 of the third cable 232, shown in FIG. 1, is coupled to a release lever (not shown) of the head restraint 230. Therefore, as the seat back 16 pivots toward the forwardly folded flat position the third cable 232 actuates the release lever and the head restraint 230 is automatically biased to the stowed position. Upon return to the seating position, the head restraint 230 is manually returned to the use position. A fourth Bowden-type cable 240, shown in FIG. 1, is operatively coupled between the head restraint 230 and the seat back handle 188 to actuate the head restraint 230 from the use position to the stowed position when the seat assembly 10 is moved to the stand-up position to prevent interference between the head restraint 230 and a vehicle headliner (not shown). Therefore, when the seat back handle 188 is operated to move the seat assembly 10 from the seating position to the stand-up position the fourth cable 240 actuates the release lever and the head restraint 230 is automatically biased to the stowed position. Upon return to the seating position, the head restraint 230 is manually returned to the use position.

Figure 11:
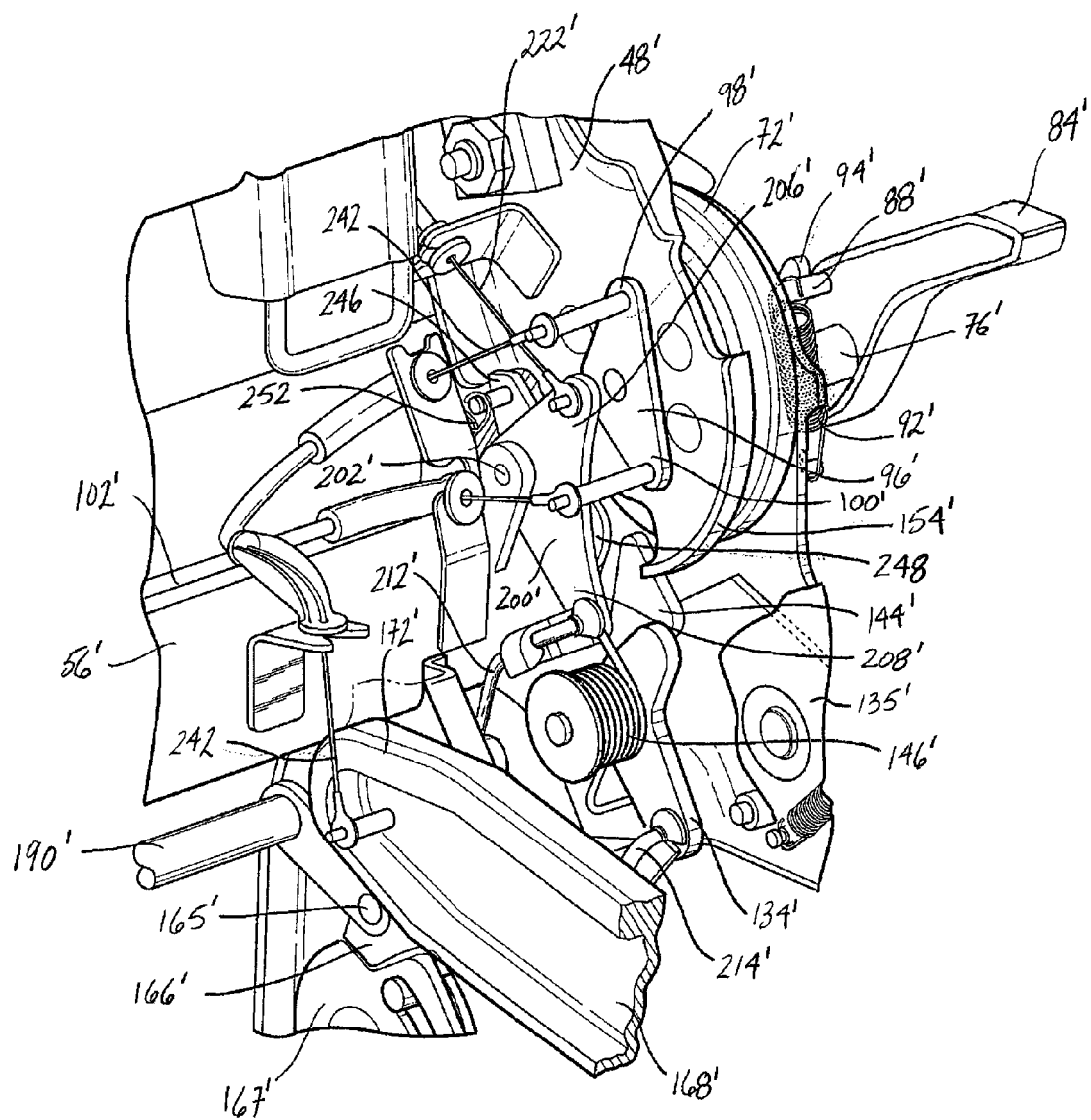
FIG. 11 is a fragmentary, inner perspective view of the outboard side of the support mechanism according to a second embodiment of the invention.
Figure 12:
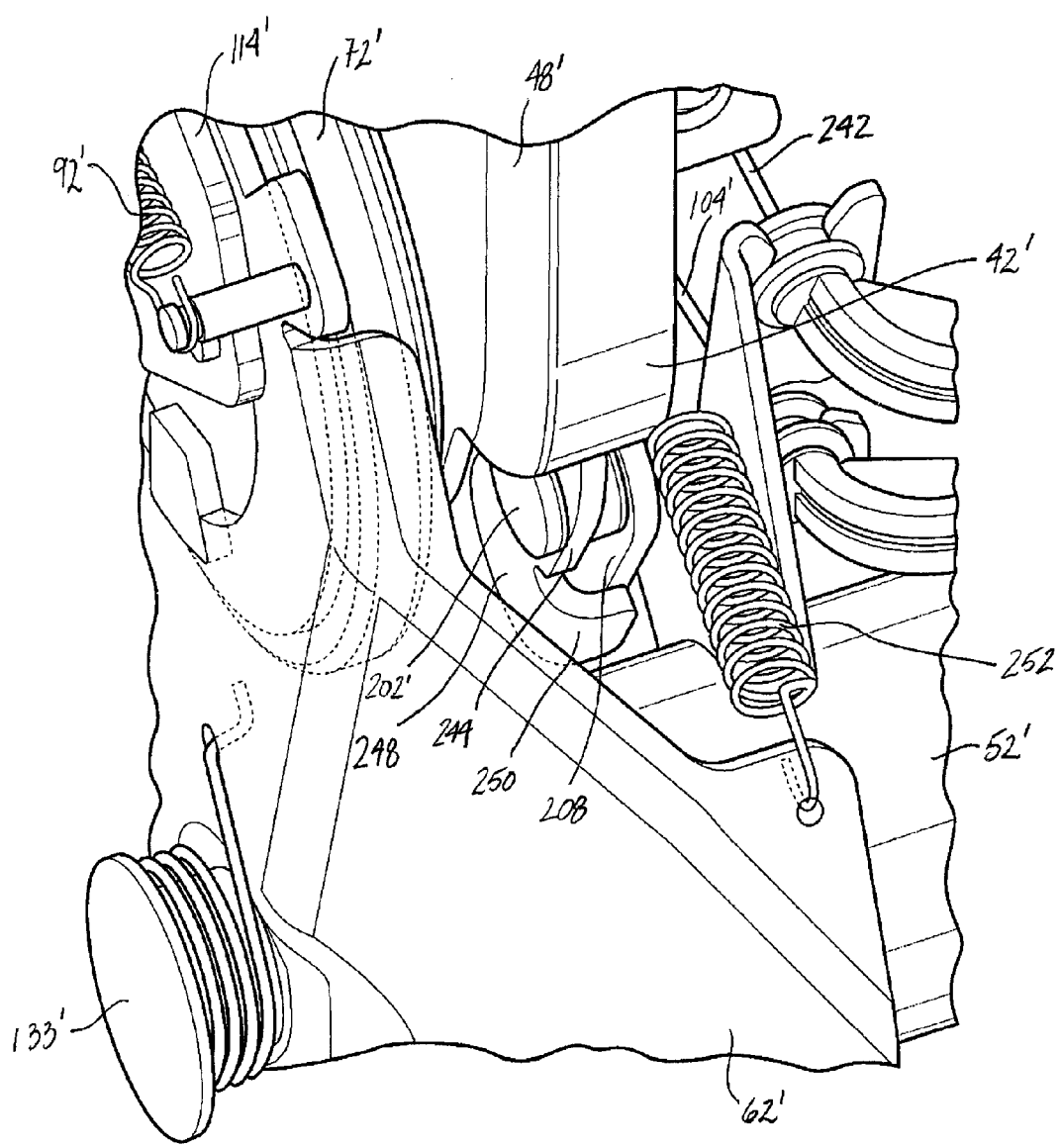
FIG. 12 is a fragmentary, outer rear perspective view of the outboard side of the support mechanism according to the second embodiment of the invention illustrating a seat back blocker in a non-blocking position.
Figure 13:
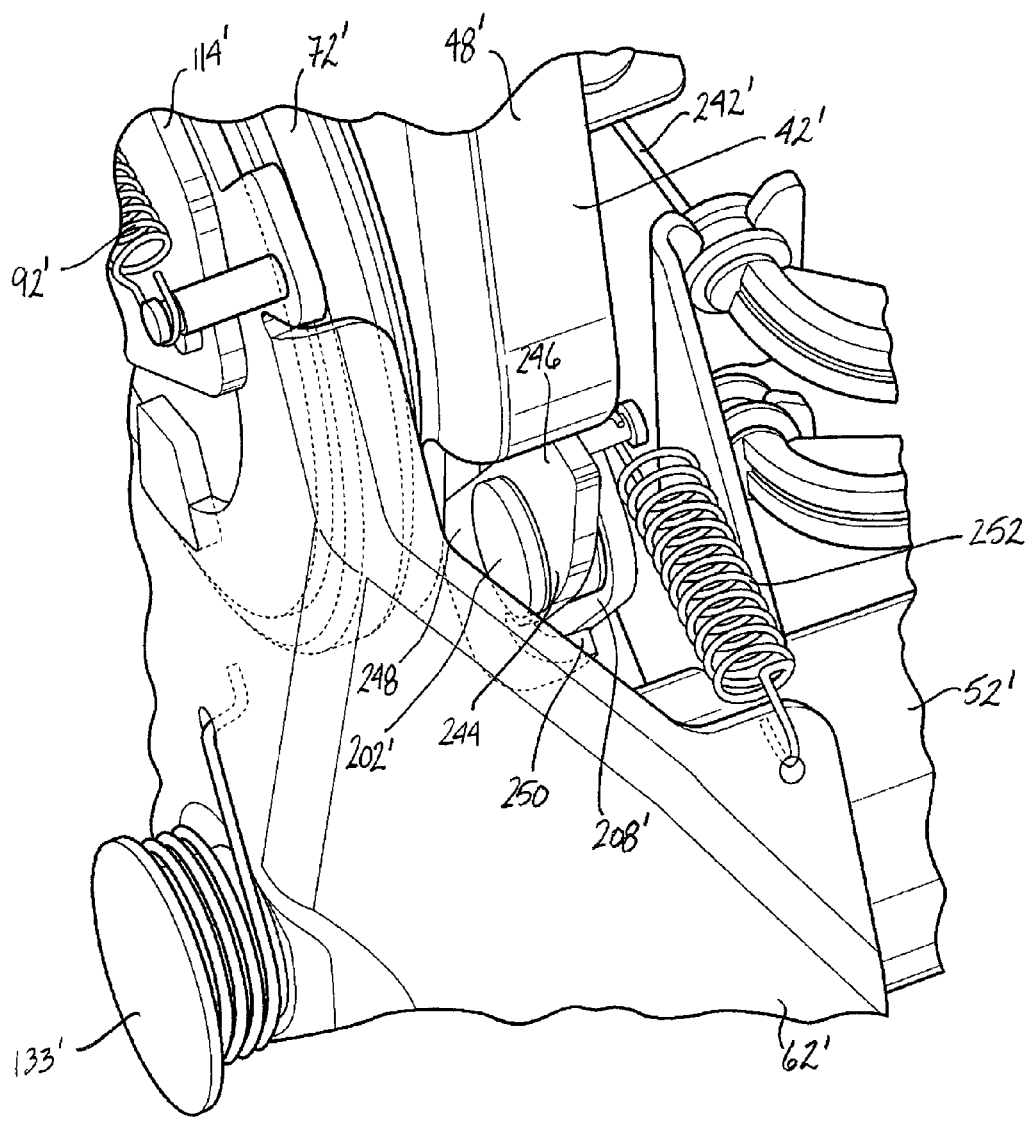
FIG. 13 is a fragmentary, outer rear perspective view of the outboard side of the support mechanism according to the second embodiment of the invention illustrating the seat back blocker in a blocking position.

Referring to FIGS. 11 through 13, wherein like primed reference numerals represent similar elements as those described above, in a second embodiment of the invention the handle efforts associated with operating the seat back handle 188' to move the seat assembly 10' from the seating position to the stand-up position are reduced. The seat back handle 188' actuates the floor latches 162' from the latched state to the unlatched state, as described with respect to the first embodiment, but the seat back handle 188' does not actuate the inboard 70' and outboard 72' disc recliners to the unlocked state. More specifically, the secondary lever 200' does not include the finger 210 for engaging the first arm 98' of the second recliner lever 96'. Therefore, when operating the seat back handle 188' to move the seat assembly 10' to the stand-up position the secondary lever 200' does not engage and pivot the second recliner lever 96'. Rather, a fifth Bowden-type cable 242 is operatively coupled between the first arm 98' of the second recliner lever 96' and the second end 172' of the stand-up link 168', as shown in FIG. 11. Thus, when the stand-up link 168' pivots to urge the seat cushion 14' toward the generally vertical position the stand-up link 168' also pulls the fifth cable 242, which causes the second recliner lever 96' to pivot in the first direction.

The second embodiment also includes a seat back blocker 244 pivotally coupled at pivot 202' between the secondary lever 200' and the outboard side 48' of the seat back frame 20'. The seat back blocker 244 extends between a blocking end 246 and an engaging end 248. The engaging end 248 includes a laterally disposed tab 250 for engaging the second portion 208' of the secondary lever 200'. A spring 252 extends between the blocking end 246 and the outboard coupling bracket 62' for biasing the seat back blocker 244 in the first direction.

When the seat assembly 10' is in the seating position the tab 250 at the engaging end 248 of the seat back blocker 244 engages the second portion 208' of the secondary lever 200', which maintains the seat back blocker 244 in a non-blocking position. In the non-blocking position, the blocking end 246 of the seat back blocker 244 is positioned such that the seat back 16' is free to pivot between the upright seating position and the plurality of reclined seating positions. In other words, when the seat back blocker 244 is in the non-blocking position, the lower end 42' of the seat back frame 20' does not abut or contact the blocking end 246 as the seat back 16' is pivoted between the upright seating position and the plurality of reclined seating positions.

When the seat back handle 188' is operated to move the seat assembly 10' to the stand-up position, the second cable 222' pivots the secondary lever 200' in the first direction. Pivoting the secondary lever 200' in the first direction allows the spring 252 to bias the seat back blocker 244 in the first direction to a blocking position wherein the tab 250 continues to engage the second portion 208' of the secondary lever 200'. In the blocking position, the blocking end 246 of the seat back blocker 244 is positioned such that the seat back 16' is prevented from reclining. In other words, when the seat back blocker 244 is in the blocking position, the lower end 42' of the seat back frame 20' abuts or contacts the blocking end 246 as the seat back 16' is pivoted rearwardly from the upright seating position.

In operation, beginning with the seat assembly 10' in the seating position, the seat assembly 10' is moved to the stand-up position by operating the seat back handle 188'. Operating the seat back handle 188' pulls the second cable 222' and pivots the secondary lever 200' in the first direction, thereby pulling the first rod 212' upwardly and causing the floor latch lever 192' to rotate in the second direction, which actuates the floor latches 162' from the latched state to the unlatched state. As the secondary lever 200' pivots in the first direction, the spring 252 biases the seat back blocker 244 from the non-blocking position to the blocking position. With the floor latches 162' in the unlatched state, the stand-up link 168' urges the seat cushion 14' to pivot about the axis A' toward the generally vertical position and pivots the support mechanism 50' in the first direction about pivot 178'. As the seat cushion 14' pivots toward the generally vertical position, the stand-up link 168' pivots about pivot 174' and pulls the fifth cable 242, which causes the second recliner lever 96' to pivot in the first direction. Pivoting the second recliner lever 96' in the first direction rotates the axial shaft 76' in the first direction, which actuates the outboard disc recliner 72' from the locked state to the unlocked state. At the same time the second recliner lever 96' pulls the first cable 102', which causes the third recliner lever 108' to pivot in the first direction. Pivoting the third recliner lever 108' in the first direction rotates the axial shaft 76' in the first direction, which actuates the inboard disc recliner 70' from the locked state to the unlocked state. With the inboard 70' and outboard 72' disc recliners in the unlocked state the seat back 16' is biased by the clock spring 78' to pivot about the axis B' towards the upright seating position. Because the dress-up member 114' is in the engaging position, the stop pin 110' engages the recess 124' of the dress-up member 114' and locates the seat back 16' in the upright seating position to generally vertically align the seat back 16' with the seat cushion 14' in the generally vertical position.

Once the seat assembly 10' is in the stand-up position, pushing rearwardly on the seat back 16' will not cause the seat back 16' to recline because the seat back blocker 244 is in the blocking position. Rather, pushing rearwardly on the seat back 16' will cause the seat assembly 10' to return to the seating position.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A seat assembly for supporting an occupant above a floor, said seat assembly comprising:
   a seat cushion having a front end and an opposite rear end, said seat cushion adapted to be pivotally coupled to the floor about said front end for movement between a generally horizontal position and a generally vertical position wherein said rear end is disposed above said front end;
   a seat back operatively coupled to said seat cushion for pivotal movement between a generally upright seating position and a forwardly fold position;
   a recliner mechanism operatively to said seat back and selectively operable between a locked state preventing pivotal movement of said seat back and an unlocked state for providing pivotal movement of said seat back between said upright seating position, a plurality of reclined seating positions disposed rearwardly of said upright seating position, and said forwardly folded position;
   a support mechanism releasably coupled to said rear end of said seat cushion allowing said seat cushion to pivot between said generally horizontal position and said generally vertical position and said support mechanism is adapted to be releasably coupled to the floor;
   wherein said support mechanism is actuated in a first sense to actuate said recliner mechanism between said locked and unlocked state and automatically release said rear end of said seat cushion from said support mechanism in response to pivotal movement of said seat back from said upright seating position toward said forwardly folded position thereby causing said seat cushion to pivot from said generally horizontal position to said generally vertical position and defining a fold and stow position; and
   a stand-up link adapted to be pivotally coupled between the floor and said support mechanism, wherein said support mechanism is actuated in a second sense to actuate said recliner mechanism between said locked and unlocked state and to release said support mechanism from the floor such that said stand-up link moves said seat cushion from said generally horizontal position to said generally vertical position and simultaneously forces said seat back to pivot relative to said seat cushion in response to pivotal movement of said seat cushion, thereby maintaining said seat back in a generally vertical orientation and defining a stand-up position.

2. A seat assembly as set forth in claim 1 wherein said recliner mechanism is automatically actuated to said unlocked state in response to releasing said support mechanism from the floor.

3. A seat assembly as set forth in claim 2 wherein said recliner mechanism is automatically actuated to said unlocked state in response to said stand-up link moving said seat cushion between said generally horizontal position and said generally vertical position thereby maintaining said seat back in a generally vertical orientation.

4. A seat assembly as set forth in claim 3 wherein said seat back is biased towards said forwardly folded position.

5. A seat assembly as set forth in claim 4 further including a dress-up member for engaging said seat back in said upright seating position to prevent said seat back from pivoting to said forwardly folded position in response to said support member being actuated in said second sense.

6. A seat assembly as set forth in claim 5 wherein said dress-up member is selectively pivotal to a retracted position allowing said seat back to pivot to said forwardly folded position in response to said support member being actuated in a second sense.

7. A seat assembly as set forth in claim 6 further including a seat back blocker for blocking said seat back in said upright seating position when said seat assembly is in said stand-up position to prevent reclining of said seat back.

8. A seat assembly as set forth in claim 7 further including a floor latch operatively coupled to said support mechanism and adapted to selectively engage the floor of the vehicle between a latched state securing said seat assembly to the floor and an unlatched state releasing said seat assembly said floor for movement to said stand-up position.

9. A seat assembly as set forth in claim 8 wherein said support mechanism includes a coupling latch operable between a latched state engaging said seat cushion and coupling said rear end of said seat cushion to said support mechanism and said seat back and an unlatched state releasing said seat cushion from said support mechanism and said seat back for pivotal movement between said generally horizontal and vertical positions.

10. A seat assembly as set forth in claim 9 further including an interlock operatively coupled between said coupling latch and said floor latch to prevent decoupling of said support mechanism from the floor when said seat assembly is in said fold and stow position and to prevent decoupling of the seat cushion from the support mechanism when said seat assembly is in said stand-up position.

11. A seat assembly as set forth in claim 10 further including a head restraint operatively coupled to said seat back for pivotal movement between an upright use position when the seat assembly is in a seating position and a folded position when said seat assembly is in said fold and stow and stand-up position.

12. A seat assembly as set forth in claim 11 wherein said head restraint is bias to said folded position.

13. A seat assembly as set forth in claim 12 wherein said head restraint includes cable operatively coupled between said head restraint and said support mechanism for automatically actuating said head restraint between said use position and said folded position in response to pivotal movement of said seat back towards said forwardly folded flat position.

* * * * *